United States Patent [19]

Blatt

[11] Patent Number: 4,905,850
[45] Date of Patent: * Mar. 6, 1990

[54] QUICK DISCONNECT BOOM MOUNT

[76] Inventor: John A. Blatt, 47 Willison, Grosse Pointe Shores, Mich. 48236

[*] Notice: The portion of the term of this patent subsequent to Feb. 6, 2007 has been disclaimed.

[21] Appl. No.: 290,635

[22] Filed: Dec. 27, 1988

Related U.S. Application Data

[63] Continuation-in-part of Ser. No. 215,743, Jul. 6, 1988.

[51] Int. Cl.[4] ............................................. B66C 23/70
[52] U.S. Cl. ................................... 212/177; 285/137.1; 901/28
[58] Field of Search .................... 212/177; 901/27, 28; 285/24, 26, 137.1, 312, 320

[56]  References Cited

U.S. PATENT DOCUMENTS

| 847,718 | 3/1907 | Ambos | 285/158 |
|---|---|---|---|
| 1,527,804 | 2/1925 | Kunst et al. | 285/189 |
| 1,594,224 | 7/1926 | Stroagson | 285/194 |
| 2,444,414 | 7/1948 | Anderson et al. | 285/312 |
| 2,837,749 | 6/1958 | Gross | 285/137.1 |
| 2,965,396 | 12/1960 | Reynolds et al. | 285/320 |
| 3,240,279 | 3/1966 | Dorkins | 285/137.1 |
| 4,111,470 | 9/1978 | Welcker | 285/320 |
| 4,596,415 | 6/1986 | Blatt | 294/88 |

Primary Examiner—Sherman D. Basinger
Assistant Examiner—Thomas J. Brahan
Attorney, Agent, or Firm—Basile and Hanlon

[57] ABSTRACT

A quick disconnect boom mount having integral fluid conduits for use with master part transfer booms having changeable part handling spider booms. The coupling utilizes a rotary locking member, having an eccentric cam disposed thereon, which rigidly clamps the part handling spider to the master boom by engaging guide rods configured in a male/female arrangement and inserted from a first coupling block attached to the spider boom into the second coupling block attached to the master boom.

6 Claims, 3 Drawing Sheets

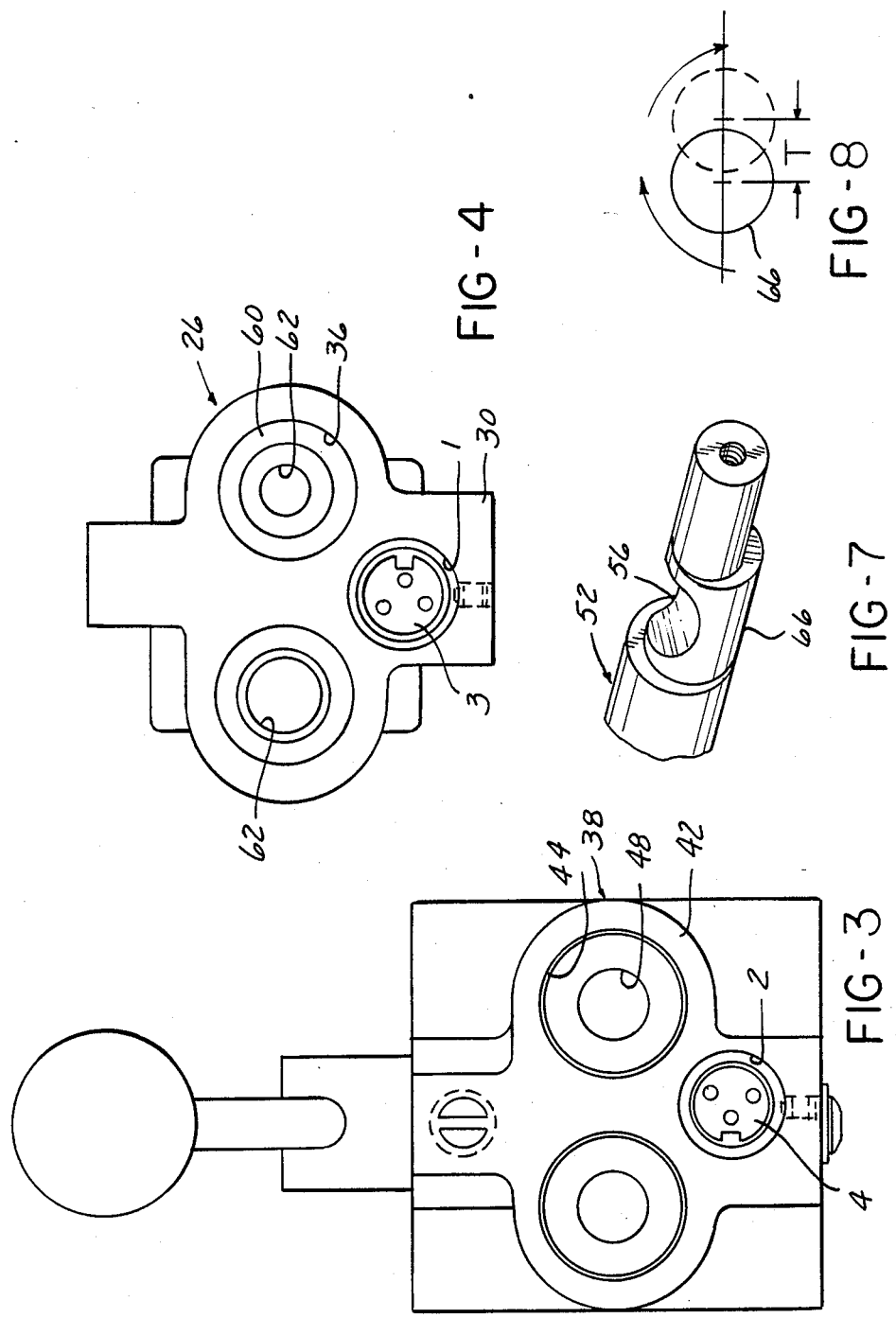

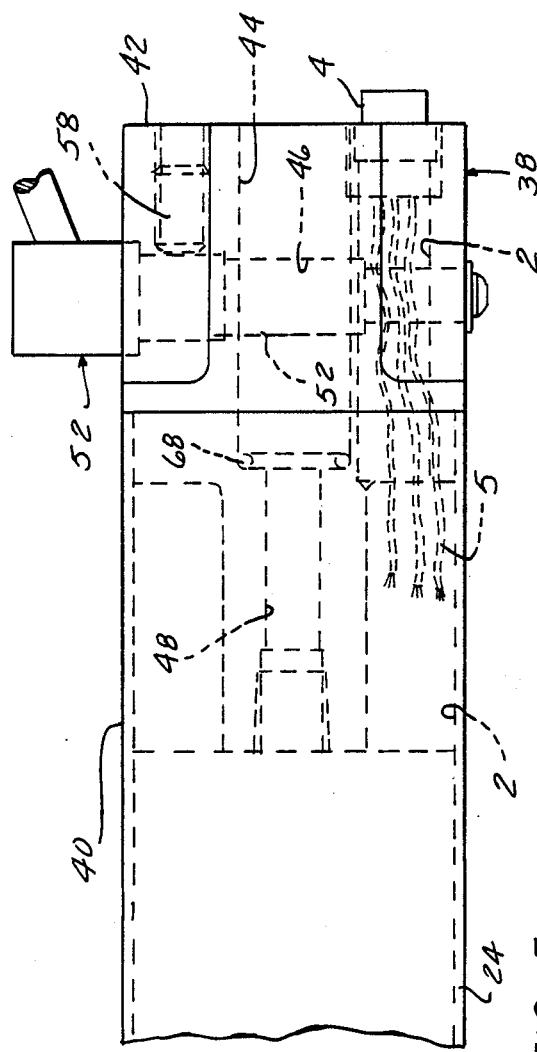
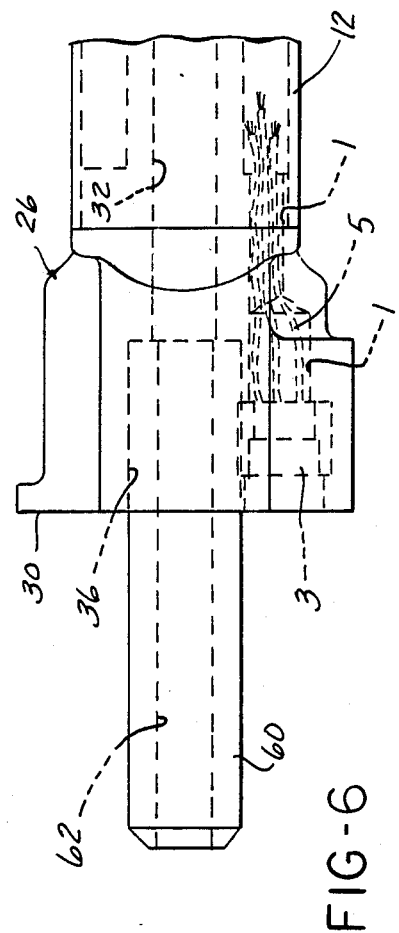

4,905,850

1

QUICK DISCONNECT BOOM MOUNT

CROSS-REFERENCES TO RELATED APPLICATIONS

This application is a continuation-in-part of U.S. Ser. No. 07/215,743 filed on July 6, 1988.

BACKGROUND OF THE INVENTION

1. Field of the Invention

The present invention is concerned with a quick disconnect boom mount having integral fluid and electrical lines of the type used with master part transfer booms having changeable part handling spider booms.

2. Description of the Relevant Art

An example of the relevant art is the inventor's U.S. Pat. No. 4,650,234, which discloses a transfer boom assembly for workpieces. The master part transfer booms and their associated spider booms are tubular pieces, having fluid passages therein, which are relatively heavy and do not lend themselves to convenient coupling. Connection of workpiece carrying spider booms to related master booms is through a sliding bracket assembly which does not couple the internal fluid passages of the master boom to those of the spider boom. Following coupling, flexible fluid lines must be used to connect the internal passages in the master part transfer boom to the workpiece supporting spider boom when fluid transfer through the internal fluid passages of the spider boom is required. Additionally, no provision is made for electrical wiring which is required to transfer electrical signals to the spider boom and associated attachments. Following coupling, electrical wiring must be wired separately to the work piece supporting spider boom as required. Such an assembly is relatively complex, expensive, and demands a great deal of time and labor for assembly. Additionally, rigidity at the point of connection is lacking, and flexible fluid hoses, which are subject to damage, are exposed to a potentially harsh environment.

The above shortcomings are addressed by the design of the present invention.

SUMMARY OF THE INVENTION

The present invention comprises a quick disconnect boom mount having integral fluid lines which directly connect the fluid passages of a master part transfer boom to those of a part handling spider boom. This eliminates the need for external connection, and adds rigidity at the point of connection.

Additionally, the quick disconnect boom mount of the present invention has integral electrical lines with electrical connectors disposed at its mating ends for quickly and directly connecting the internal electrical lines of the master part transfer boom to internal electrical lines of the part handling spider boom, thereby eliminating the need for external electrical lines at the point of connection.

The quick disconnect coupling is for use with a new type of boom having a rigid hollow boom sleeve containing internal fluid and electrical lines. At locations of workpiece connection, the fluid lines enter manifolds, disposed within the boom, and it is at these points that flexible fluid lines are connected to supply external part handling equipment.

The quick disconnect coupling of the present invention further comprises a rotary locking mechanism, having an eccentric cam disposed therein, which rigidly clamps the part handling spider to the master boom. Clamping is achieved using guide rods, fixedly connected to a first coupling member which is mounted to the spider boom. The guide rods slidingly engage guide rod receiving bores in a second coupling member which is mounted to the master boom. The first and second coupling members have respective end faces which seat in face-to-face engagement with each other when the guide rods of the first coupling member are inserted into the guide rod receiving bores of the second coupling member. Coupling is carried out while the rotary locking member is in a non-interference position. After coupling, the cam locking mechanism is rotated, preferably 180 degrees, to lock the eccentric cam member into a groove in one of the spider boom guide rods.

To remove the spider boom from the master boom for replacement or repair, the rotary locking member is rotated from the locked position to the non-interference, unlocked, position where detente means holds the locking mechanism in the unlock position. In the non-interference position, a clearance groove in the rotary locking member is presented to the guide rod allowing it, and the spider boom, to be slidingly disengaged from the master boom. Sealing means, such as O-rings or the like, are disposed within the quick disconnect boom mount to facilitate sealing of the fluid passages during connection.

The sliding engagement of the quick disconnect boom mount of the present invention removes any shake or slop which is inherent in other disconnects.

The high tolerance connection provided by the quick disconnect coupling of the present invention allows integration of electrical means into the quick disconnect coupling. Electrical connections allow part proximity switches, and the like, to be permanently wired through the boom spiders, with wire harnesses routed inside the boom tubing. Such a design protects wiring from hazardous environments. Electrical connector means are disposed within the mating ends of the coupling members and are attached to electrical lines passing through longitudinally extending bores in the coupling members. When the first and second coupling members are brought into face-to-face engagement, the electrical connectors, disposed within the coupling members, are likewise brought into engagement thereby electrically connecting the wiring harnesses disposed within the master part transfer boom and the part handling spider boom.

Other objects and features of the invention will become apparent by reference to the following specification and to the drawings.

BRIEF DESCRIPTION OF THE DRAWINGS

FIG. 3 is an end view of a master boom end face and its associated coupling member;

FIG. 4 is an end view of a spider boom end face and its associated coupling member;

FIG. 5 is a side view of one coupling member showing various internal details in phantom;

FIG. 6 is a side view of a second coupling member showing various internal details in phantom;

FIG. 7 is a partial perspective view of the rotary locking member of the present invention; and FIG. 8 is a schematic view of the displacement of the eccentric cam in the present invention.

DESCRIPTION OF THE PREFERRED EMBODIMENT

Figure 1:
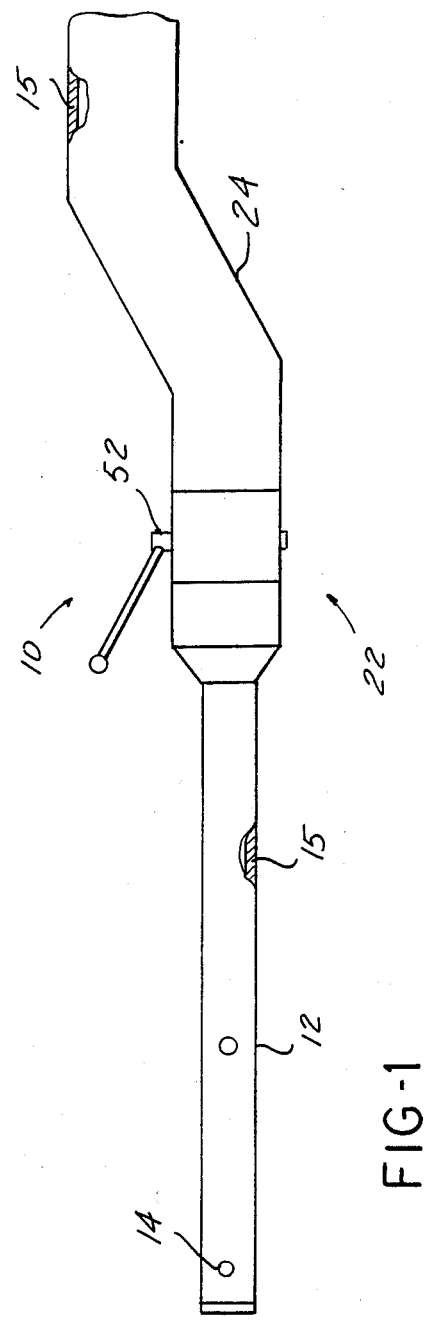
FIG. 1 is a partial side view of a typical master boom-spider boom assembly utilizing the present invention.

In FIG. 1, there is shown a transfer boom assembly, designated generally as 10, incorporating the quick disconnect boom mount of the present invention. The transfer boom assembly comprises a workpiece handling spider boom 12, and a master boom 24. Support bars 14, extending outwardly from the transfer boom are utilized to support part handling equipment (not shown) attached thereto. The boom 12, 24 comprise hollow, rigid tubing 15, as shown in FIGS. 5 and 6. The tubing 15 is preferably of steel and has fluid conduits (not shown) useful for the passage of air and the like, disposed therein which extend longitudinally and in spaced, parallel relationship to the axis of each respective boom. Electrical wiring 5 is disposed within the boom tubing 15 for sending signals to and from electrical apparatus attached to various workpieces.

To ease application of the transfer boom assembly 10 in a manufacturing environment, it is desirable to facilitate quick removal and replacement of the spider boom 12, from the master boom 24, utilizing the quick disconnect mount, designated generally 22. The mount comprises first and second coupling members 26 and 38, respectively. Coupling members 26 and 38 have first end faces 30 and 42, respectively, which are adapted for face-to-face engagement when coupling members 26 and 38 are in a coupled position. The first coupling member 26 is configured as a manifold with internal fluid conduits 32 extending longitudinally therethrough, and offset in such a manner as to align at one end with the passages in the master boom 24 and at the other end with the passages in the spider boom 12, respectively. A second end 28 of first coupling member 26 is configured to slidingly engage the end of spider boom 12 as shown in FIG. 6. The internal fluid conduits 32 of first coupling member 26 sealingly engage the fluid conduits in spider boom 12, utilizing sealing means such as O-rings, when the spider boom 12 and first coupling member 26 are engaged. Fixing means, such as screws (not shown), fixedly attach the second end 28 of first coupling member 26 into engagement with spider boom 12.

At least two (2) guide rods 60 are fixedly mounted in mounting bores 36 of first coupling member 26. The guide rods 60 are mounted into bores 36 by press fitting, or other suitable means for fixing. The rods 60 project, in spaced parallel relationship to the axis of first coupling member 26, from the first end face 30 of coupling member 26. At least two (2) guide rod receiving bores 44 extend into the first end face 42, of second coupling member 38, in spaced, parallel relationship, longitudinally therewith and in alignment with the guide rods 60 projecting from said first coupling member 26. The receiving bores 44 are adapted to slidably receive guide rods 60 to guide first and second coupling members 26 and 38 to and from a coupled position.

Electrical conduits 1 and 2 extend through first and second coupling members 26 and 38, respectively. The conduits 1 and 2 comprise longitudinally extending bores formed in the coupling members which are placed so as to avoid interference with the internal fluid conduits extending through the coupling members or the locking member, described below, utilized to hold first and second coupling members 26 and 38 into engagement. The electrical conduits 1 and 2 are formed in first and second coupling members 26 and 38 so as to extend in coaxial alignment with each other when the coupling members are brought into engagement. Disposed in electrical conduits 1 and 2 are electrical connector means 3 and 4, and associated electrical wiring 5, shown in FIGS. 5 and 6. The electrical connectors may consist of male/female plug-type members which are slidably engageable with each other when end face 30 of the first coupling member is brought into face-to-face engagement with end face 32 of second coupling member 38. Engagement of the electrical connector means 3 and 4 disposed in electrical conduits 1 and 2 of first and second coupling members 26 and 38 allow electrical wiring harnesses disposed in spider boom 12 to be brought into engagement with corresponding electrical wiring harnesses disposed within master boom 24 without the necessity of external wiring following coupling of the transfer boom assembly.

A third bore 46 extends through second coupling member 38 along a third axis normal to, and offset from, the axes of the guide rod receiving bores 44. The third bore 46, partially intersects one of the guide rod receiving bores 44, creating an interference, indicated in FIG. 2. The second end 40 of second coupling member 38 is configured to slidingly engage the end of master boom 24. Sealing means, such as O-rings, are disposed at the connecting face to sealingly engage the fluid conduits in master boom 24 with fluid conduits 48 in second coupling member 38, described below. Fixing means, such as machine screws or other suitable means, are utilized to fixedly attach the second end 40 of second coupling member 38 into engagement with master boom 24.

Rotatably mounted in third bore 46, of the second coupling member 38, is a rotary locking member 52. Rotary locking member 52 has an eccentric cam portion 66, shown in FIG. 7, formed thereon at the intersection of the third bore 46 and the guide rod receiving bore 44. A clearance recess 56 is formed on the rotary locking member 52, diametrically opposed to the eccentric cam portion 66. Clearance recess 56 may be positioned, upon rotation of locking member 52, to avoid interference with receiving bore 44, thereby accommodating insertion or withdrawal of guide rods 60. Detente means 58 may be disposed within the second coupling member 38 for maintaining the rotary locking member in a desired position.

A cam receiving recess 64 is formed in that guide rod 60 through which third bore 46 partially intersects. The cam receiving recess 64 is positioned at the intersection of the third bore 46 and the guide rod receiving bore 44.

Fluid conduits 32, 48, 62 extend longitudinally through the first and second coupling members 26 and 38, and through guide rods 60, respectively, and are in coaxial fluid communication with each other when coupling members 26 and 38 are seated in face-to-face engagement. The fluid conduits 32, 48, 62 transfer working fluid from master boom fluid conduits to spider boom fluid conduits when coupling members 26 and 38 are in a coupled position. Sealing means, such as O-rings or the like, are disposed at joining positions of fluid conduits 32, 48, 62, allowing fluid tight coupling of the bores when in a coupled position.

Figure 2:
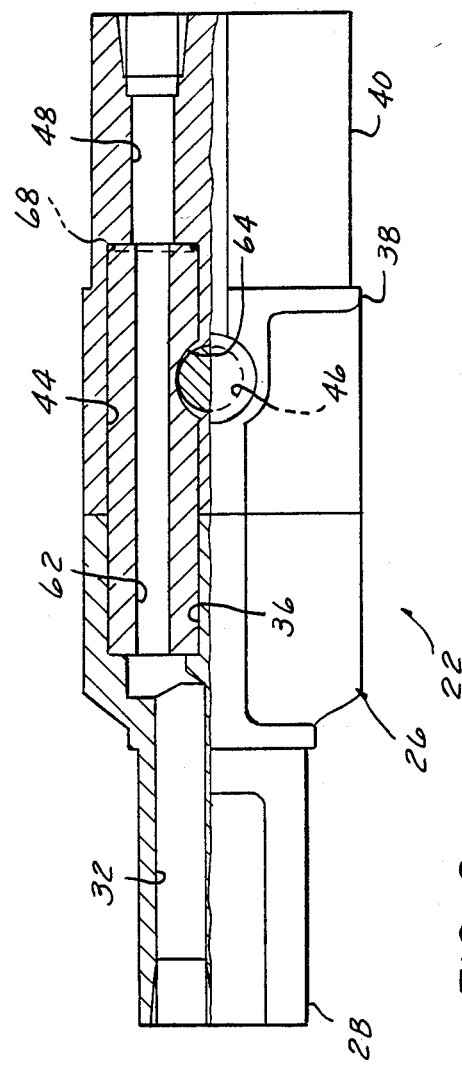
FIG. 2 is a top view, partially in section, of the quick disconnect coupling of the present invention.

In operation, spider boom 12, to which first coupling member 26, guide rods 60, and electrical connector 3, are fixedly attached, is slidingly engaged with master boom 24, to which second coupling member 38 and corresponding electrical connector 4 is fixedly attached. Upon engagement, guide rods 60 and electrical connector 3 slidingly engage guide rod receiving bores 44 and corresponding electrical connector 4 of second coupling member 38. Once seated, rotary locking member 52 is rotated, preferably 180 degrees, to move eccentric cam portion 66 into engagement with cam receiving recess 64, as shown in FIG. 2. The displacement of cam portion 66, indicated by T in FIG. 8, fully seats guide rods 60 against sealing means 68 and electrical connector 3 with electrical connector 4. Sealing means 68 may comprise O-rings or other suitable sealing devices. Additionally, the engagement of eccentric cam portion 66 with cam receiving recess 64 will urge first and second coupling members 26 and 38 into locked, face-to-face engagement preventing separation of spider boom 12 from master boom 24 and providing a rigid coupling having internal fluid conduits and electrical lines sealingly engaged within interlocking transfer boom assembly 10.

To remove spider boom 12, for replacement or repair, rotary locking member 52 is rotated 180 degrees to a non-interference position in which clearance recess 56, of rotary locking member 52, is presented to guide rod 60 and guide rod receiving bore 44 thus facilitating sliding removal of spider boom 12 from master boom 24.

While one embodiment of the invention has been described in detail above in relation to quick disconnect boom mounts for transfer boom assemblies, it will be apparent to those skilled in the art that the disclosed embodiment may be modified. Therefore, the foregoing description is considered to be exemplary rather than limiting and the true scope of the invention is that defined in the following claims.

What is claimed is:

1. A quick disconnect boom mount comprising:
   a first and a second coupling member having respective end faces adapted to be seated in face-to-face engagement with each other when said coupling members are in a coupled position;
   guide rods fixedly mounted in said first coupling member and projecting in spaced parallel relationship from said end face of said first coupling member;
   means defining guide rod receiving bores, corresponding in number to said guide rods, extending into said second coupling member from said end face of said second coupling member, along spaced parallel axes, said bores in said second coupling member being adapted to slidably receive said guide rods of said first coupling member, said guide rods and said receiving bores cooperating to guide said coupling members to and from said coupled position;
   electrical means extending longitudinally through said first and second coupling members;
   electrical connector means, disposed at said end faces of said coupling members, for connecting said electrical means in said first and second coupling members when said coupling members are in said coupled position;
   means defining a third bore in said second coupling member extending along a third axis normal to and offset from said parallel axes, said third bore intersecting one of said guide rod receiving bores;
   a rotary locking member mounted within said third bore for rotation therein;
   an eccentric cam portion on said locking member at the intersection of said third bore and said one of said guide rod receiving bores;
   means defining a clearance recess in said locking member, diametrically opposed to said eccentric cam portion;
   means defining a cam receiving recess in that guide rod receivable in said one of said guide rod receiving bores, said rotary member being rotatable within said third bore between a release position wherein said clearance recess is positioned to accommodate insertion or withdrawal of said guide rods into or from said guide rod receiving bores and a coupling position wherein said cam portion is engaged within said cam receiving recess to lock said coupling members in said coupled position.

2. A quick disconnect boom mount, as defined in claim 1, said mount further comprising:
   means defining fluid passage bores extending longitudinally through said first and second coupling members and said guide rods in coaxial fluid communication with each other when said coupling members are in said coupled position.

3. A quick disconnect boom mount, as defined in claim 2, said mount further comprising:
   sealing means, disposed between said guide rods and said coupling members when said coupling members are in said coupled position.

4. A quick disconnect boom mount comprising:
   a first coupling member and a second coupling member having respective end faces disposed in face-to-face relationship with each other when said coupling members are in a coupled position;
   guide rods fixedly mounted in said first coupling member and projecting in spaced parallel relationship from said end face of said first coupling member;
   means defining guide rod receiving bores extending into said second coupling member from said end face of said coupling member, along spaced parallel axis, said bores and said second coupling member being adapted to slidably receive said guide rods of said first coupling member, said guide rods and said receiving bores cooperating to guide said coupling members to and from said coupled position;
   means defining a third bore in said second coupling member extending along a third axis normal to and offset from said parallel axis, said third bore intersecting one of said guide rod receiving bores;
   a rotary locking member mounted within said third bore for rotation therein;
   an eccentric cam portion on said locking member at the intersection of said third bore and said one of said guide rod receiving bores;
   means defining a clearance recess in said locking member, diametrically opposed to said eccentric cam portion; and
   means defining a cam receiving recess in that guide rod receivable in said one of said guide rod receiving bores, said rotary member being rotatable within said third bore between a release position wherein said clearance recess is positioned to accommodate movement of said guide rods within said guide rod receiving bores and a coupling position wherein said cam portion is engaged within said cam receiving recess to lock said coupling members in said coupled position.

5. The quick disconnect boom mount as defined in claim 4, further comprising:
   electrical means extending longitudinally through said first and second coupling members; and
   electrical connector means, disposed at said end faces of said coupling members, for connecting said electrical means in said first and second coupling members when said coupling members are in said coupled position.

6. The quick disconnect boom mount as defined in claim 4 further comprising:
   means defining fluid passage bores extending longitudinally through said first and second coupling members and said guide rods in coaxial fluid communication with each other when said coupling members are in said coupled position; and
   sealing means, disposed between said guide rods and said coupling members when said coupling members are in said coupled position.

* * * * *